(12) United States Patent
Song et al.

(10) Patent No.: US 9,702,521 B2
(45) Date of Patent: Jul. 11, 2017

(54) LUMINAIRE

(71) Applicant: PHILIPS LIGHTING HOLDING B.V., Eindhoven (NL)

(72) Inventors: Gang Song, Shanghai (CN); Caijie Yan, Shanghai (CN); Wei Wang, Shanghai (CN)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/908,137

(22) PCT Filed: Jan. 13, 2015

(86) PCT No.: PCT/EP2015/050440
§ 371 (c)(1),
(2) Date: Jan. 28, 2016

(87) PCT Pub. No.: WO2015/110308
PCT Pub. Date: Jul. 30, 2015

(65) Prior Publication Data
US 2016/0320020 A1    Nov. 3, 2016

(30) Foreign Application Priority Data

Jan. 23, 2014 (WO) ................ PCT/CN2014/000081
Apr. 3, 2014 (EP) ..................................... 14163312

(51) Int. Cl.
*F21V 7/06* (2006.01)
*F21V 7/00* (2006.01)
*G02B 19/00* (2006.01)
*F21V 29/503* (2015.01)
(Continued)

(52) U.S. Cl.
CPC .......... *F21V 7/0033* (2013.01); *F21V 3/0445* (2013.01); *F21V 5/004* (2013.01);
(Continued)

(58) Field of Classification Search
CPC ...... F21V 7/0033; F21V 19/0035; F21V 7/06; F21V 5/007; F21V 3/0045; F21V 29/503;
(Continued)

(56) References Cited

U.S. PATENT DOCUMENTS 3,647,284 A    3/1972 Elings et al.
5,977,938 A    11/1999 Iwasa
(Continued)

FOREIGN PATENT DOCUMENTS

TW    M436601 U    9/2012

*Primary Examiner* — Peggy Neils

(57) ABSTRACT

Disclosed is a luminaire (100) comprising a chamber delimited by a body (110) defining a light exit surface of the luminaire; and an optical cavity (135) inside the chamber such that the chamber comprises a volume (112) delimited by the body and the optical cavity, wherein the optical cavity is delimited by a first parabolic mirror (120) and a second parabolic mirror (130) facing the first parabolic mirror, the second parabolic mirror comprising an aperture (132) facing the volume, the optical cavity comprising a light source (140) mounted inside said cavity; wherein the first parabolic mirror and the second parabolic mirror are shaped to create an image (12) of the light source in the volume.

14 Claims, 10 Drawing Sheets

(51) Int. Cl.
*F21V 3/04* (2006.01)
*F21V 5/00* (2015.01)
*F21V 19/00* (2006.01)
*F21W 131/103* (2006.01)
*F21Y 115/00* (2016.01)
*F21W 121/00* (2006.01)
*F21W 131/10* (2006.01)

(52) U.S. Cl.
CPC ............... *F21V 5/007* (2013.01); *F21V 7/06* (2013.01); *F21V 19/0035* (2013.01); *F21V 29/503* (2015.01); *G02B 19/0028* (2013.01); *G02B 19/0066* (2013.01); *F21W 2121/00* (2013.01); *F21W 2131/10* (2013.01); *F21W 2131/103* (2013.01); *F21Y 2115/00* (2016.08)

(58) Field of Classification Search
CPC ... F21V 5/004; F21V 3/0445; F21W 2131/10; F21W 2121/00; F21Y 2113/20; F21Y 2115/10
See application file for complete search history.

(56) References Cited

U.S. PATENT DOCUMENTS

| | | | | |
|---|---|---|---|---|
| 6,040,522 A | * | 3/2000 | Beggs | H01R 4/66 174/5 SG |
| 7,841,734 B2 | | 11/2010 | Wilcox | |
| 8,165,434 B2 | * | 4/2012 | Bourget | G02B 6/0006 362/296.01 |
| 9,016,895 B2 | * | 4/2015 | Handsaker | F21V 5/04 362/235 |
| 9,151,463 B2 | * | 10/2015 | Ouderkirk | F21V 7/00 |
| 9,163,803 B2 | * | 10/2015 | Dennis | B60Q 1/0058 |
| 9,260,201 B2 | * | 2/2016 | Hessling | B64D 47/06 |
| 2007/0008636 A1 | * | 1/2007 | Cuo | G02B 27/2292 359/857 |
| 2008/0094842 A1 | | 4/2008 | King et al. | |
| 2009/0225543 A1 | * | 9/2009 | Jacobson | F21V 5/007 362/247 |
| 2010/0239207 A1 | | 9/2010 | Bourget | |
| 2012/0038890 A1 | | 2/2012 | Sun et al. | |
| 2014/0071246 A1 | | 3/2014 | Campbell | |

\* cited by examiner

LUMINAIRE

CROSS-REFERENCE TO PRIOR APPLICATIONS

This application is the U.S. National Phase application under 35 U.S.C. §371 of International Application No. PCT/EP2015/050440, filed on Jan. 13, 2015, which claims the benefit of European Patent Application No. 14163312.3, filed on Apr. 3, 2014 and PCT/CN2014/000081, filed on Jan. 23, 2014. These applications are hereby incorporated by reference herein.

FIELD OF THE INVENTION

The present invention relates to a luminaire comprising a chamber delimited by a body defining a light exit surface of the luminaire, such as a luminaire for urban landscape lighting.

BACKGROUND OF THE INVENTION

Urban landscape lighting such as road lighting, street lighting, square lighting and so on is commonplace in many urban areas to provide illumination of such areas, which for instance is important for safety and security reasons. Many types of luminaires are used for urban landscape lighting, such as for instance post-top lighting, column lighting, bollard lighting and so on.

The functional lighting provided by such luminaries typically has to meet specific regulations in order to ensure that appropriate lighting levels are provided in a safe manner, e.g. by ensuring that glare levels produced by the luminaire are kept below defined thresholds.

Consequently, the design of such luminaires must be suitable to meet the aforementioned specific regulations. At the same time, because such luminaires are placed in urban environments, the appearance of such luminaires is important, for instance because the luminaire preferably has to blend into the environment in which it is placed. In other words, the luminaire preferably should be decorative whilst at the same time providing the required functional lighting in order to ensure that the luminaire is considered a welcome addition to the urban environment in which it is placed.

It has been recognized that the appearance of the luminaire in an urban landscape can be controlled not only by the appearance of the luminaire itself but also by shaping the luminous output of the luminaire. It is for instance is known to adjust the lighting pattern produced by a luminaire upon detection of a person in the vicinity of the luminaire. However, such dynamic variations of the lighting pattern may be beneficial for functional reasons but may not be considered aesthetically pleasing. In addition, the cost of such luminaires is significantly increased due to the requirement of motion detection sensors or the like and appropriate controllers responsive to such sensors that control the luminous output of the luminaire.

WO 2009/145883 A1 discloses a LED lighting fixture that includes a support structure having a horizontal cross-dimension and a top structure attached to the support structure and extending outwardly beyond the support structure. The top structure has a bottom surface with a peripheral portion surrounding a non-peripheral portion. A plurality of LED emitters is positioned on the peripheral portion for emitting light in downward direction substantially outside of the horizontal cross-dimension of the support structure. This luminous distribution of this fixture is claimed to be adaptable to meet the needs of a wide variety of (outdoor) lighting situations. However, these luminous distributions are entirely functional and do not target an aesthetically pleasing appearance.

US2010/239207A1 discloses an optical coupling device including a first parabolic reflector having an aperture at the first parabolic reflector vertex; a second parabolic reflector facing the first parabolic reflector; a light source positioned at the second parabolic reflector vertex; and a negative element located at the aperture for reducing the numerical aperture of the light emitted from the optical coupling device.

SUMMARY OF THE INVENTION

The present invention seeks to provide a luminaire that can produce a more appealing luminous output.

According to an aspect, there is provided a luminaire comprising a chamber delimited by a body defining a light exit surface of the luminaire; and an optical cavity inside the chamber such that the chamber comprises a volume delimited by the body and the optical cavity, wherein the optical cavity is delimited by a first parabolic mirror and a second parabolic mirror facing the first parabolic mirror, the second parabolic mirror comprising an aperture facing the volume, the optical cavity comprising a light source mounted inside said cavity, wherein the first parabolic mirror and the second parabolic mirror are shaped to create an image of the light source in the volume.

The present invention is based on the realization that a three-dimensional image can be generated inside a luminaire that is visible to an observer of the luminaire by the inclusion of a pair of parabolic mirrors that cooperate to form an optical cavity in which a light source is placed, which light source is replicated in the volume delimited by the body and the optical cavity. This therefore enhances the appearance of the luminaire.

It is known per se to create a three-dimensional image of an object inside a cavity formed by a pair of parabolic mirrors facing each other; an example of such a product for instance is the Mirascope™. However, the inclusion of such products in a luminaire has not been previously suggested. Moreover, an important distinction between such known 3-D image forming products and the present invention is that these prior art products rely on ambient or otherwise incident light to form the 3-D image, which therefore requires the object to be imaged to be located away from the aperture in the second parabolic mirror to maximize the amount of light entering the optical cavity. In addition, due to the fact that the amount of light entering the optical cavity is relatively limited, the created 3-D image of these prior art products is relatively faint and can only be observed under specific viewing angles.

Embodiments of the present invention overcome these problems by the inclusion of a light source inside the optical cavity, such that the location of the object to be imaged, e.g. the light source or an object enveloping the light source, is no longer critical and a much brighter 3-D image can be generated due to the fact that more light can be injected into the optical cavity by the light source. This for instance provides more design freedom, e.g. in terms of the location in which the 3-D image is formed within the volume.

The optical cavity may be located in any suitable location within the chamber. For instance, the optical cavity may be mounted in an upper or lower region of the chamber with the aperture facing said volume.

In an embodiment, the optical cavity is mounted in said upper region and defines a lid of said chamber, the luminaire further comprising at least one fixing member for securing the lid to the chamber. This has the advantage that the luminaire does not require a separate lid or roof section, which therefore reduces the complexity and cost of the luminaire.

The light source may be placed in a decorative holder or object to further enhance the aesthetic appearance of the luminaire. This is achieved because the decorative holder becomes the object to be imaged such that the 3-D image formed in the volume may be considered more aesthetically pleasing compared to for instance an imaged light source only.

In an embodiment, the first parabolic mirror creates a first focal point and the second parabolic mirror creates a second focal point, wherein the first focal point is spatially separated from the second focal point. This allows for more design freedom such as greater flexibility in the location in which the observable 3-D image is generated.

Preferably, the luminaire further comprises a plurality of solid state lighting elements in said chamber, wherein the solid state lighting elements are arranged to create a luminous distribution under a first range of viewing angles outside said luminaire such that the image can be observed outside said first range. This allows for the generation of functional lighting in the first range of viewing angles, which makes the luminaire particularly suitable for use in urban environments, e.g. as urban landscape lighting.

The luminaire may further comprise a lens array over each of the solid state lighting elements for shaping the luminous distribution of said solid state lighting element. This for instance may have functional reasons, e.g. to ensure that the luminous distribution produced by the solid state lighting elements is limited to the first range of viewing angles.

In an embodiment, the lens array comprises a plurality of micro lenses each having a light exit surface angled relative to the normal of the main surface of the lens array for redirecting light from the solid state lighting element in a direction determined by said angle, wherein said plurality of micro lenses comprises at least a subset of micro lenses cooperating to create a pattern in said luminous distribution. Consequently, the lens array may be arranged to create aesthetically pleasing patterns, for instance on the light exit surface of the luminaire, which may complement the 3-D image generated in the volume within the chamber to further enhance the aesthetic appearance of the luminaire.

The solid state lighting elements may be mounted on a holder to facilitate the securing of the solid state lighting elements within the luminaire.

The holder may comprise a cavity housing a heat sink thermally coupled to at least some of the solid state lighting elements to ensure that the heat generated by the solid state lighting elements is sufficiently dissipated.

The lens array of each solid state lighting element may be mounted on said holder such that the lens array is spatially separated from said solid state lighting element.

This avoids overheating of the lens array and furthermore increases the design flexibility as the distance between the solid state lighting elements and the lens array may be varied according to design requirements.

In an embodiment, the holder is mounted against the second parabolic mirror. This yields a particularly compact design, which is straightforward to manufacture and is aesthetically pleasing.

The luminaire may further comprise a mounting post, wherein the luminaire is mounted at one end of the mounting post. For instance, the luminaire including the mounting post may be a luminaire for use in an urban landscape, e.g. a street luminaire, square luminaire, road luminaire and so on.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
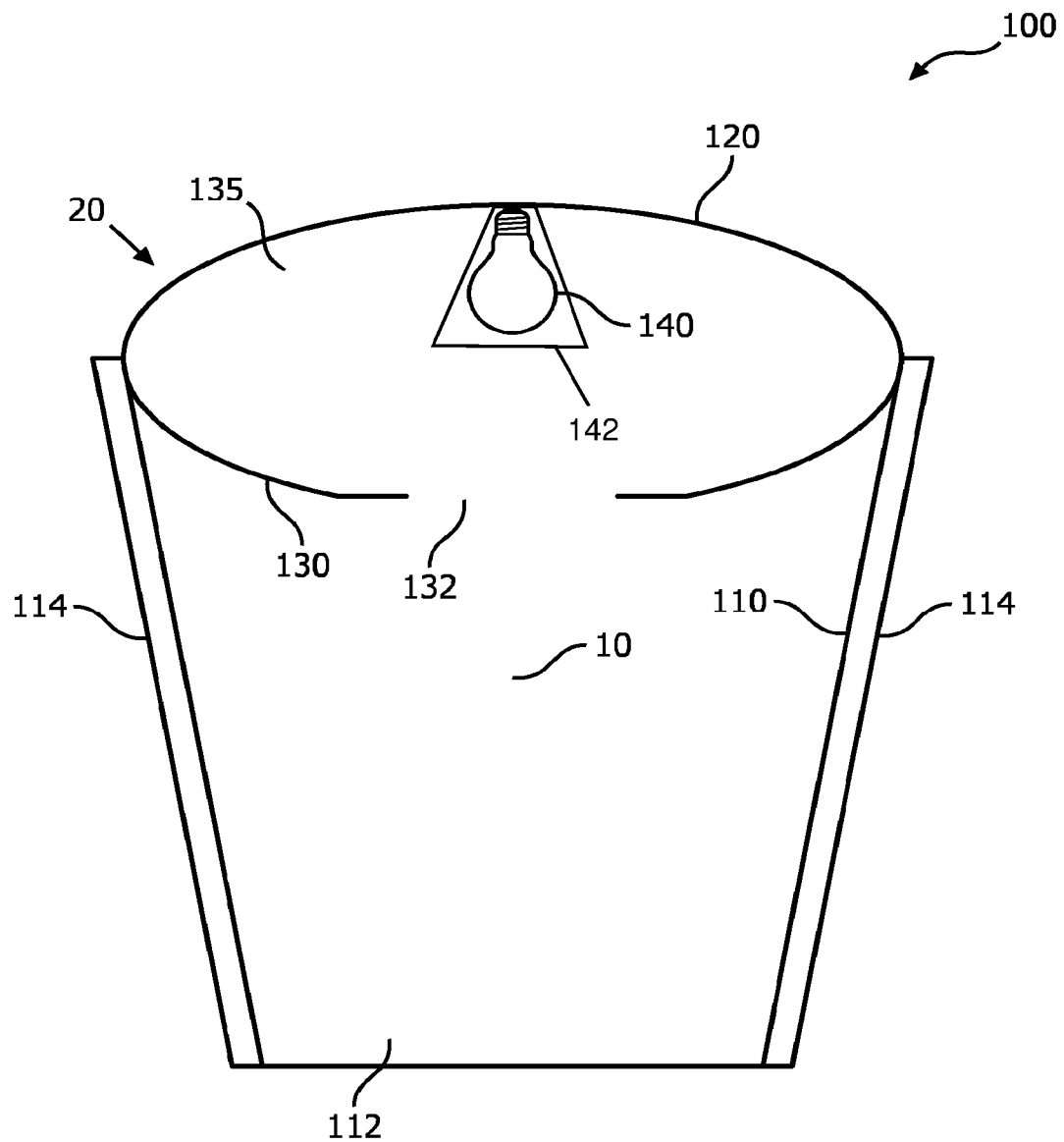
FIG. 1 schematically depicts a luminaire according to an embodiment of the present invention.

It should be understood that the Figures are merely schematic and are not drawn to scale. It should also be understood that the same reference numerals are used throughout the Figures to indicate the same or similar parts.

FIG. 1 schematically depicts a luminaire 100 according to an embodiment of the present invention. The luminaire 100 comprises a body 110, which defines the chamber of the luminaire 100. The body 110 further defines at least one light exit surface of the luminaire 100, which light exit surface may be transparent, translucent, partially transparent, partially translucent or combinations thereof. The body 110 may comprise a single surface, e.g. may be a curved (annular) body defining a closed shape, or may comprise multiple surfaces, which multiple surfaces for instance may be joined by support structures at the edges of the services as is well-known per se. In other words, the body 110 may have any suitable shape and may be made of any suitable material or combination of materials. In an embodiment, the body 110 is made of a transparent or translucent optical grade polymer such as polycarbonate (PC), poly (methylmethacrylate) (PMMA), polyethylene terephthalate (PET) and so on. An at least partially transparent body 110 is particularly preferred for reasons that will be explained in more detail below.

The luminaire 100 further comprises an optical cavity 135 defined by a first parabolic mirror 120 and a second parabolic mirror 130, which parabolic mirrors are arranged in a cooperative manner to define the optical cavity 135. In the context of the present application, a mirror may be any element capable of reflecting incident light. The first parabolic mirror 120 and the second parabolic mirror 130 may be made of any suitable material or combination of materials, e.g. aluminium or another suitable reflective metal, a non-reflective carrier having a reflective coating and so on. The optical cavity 135 is placed in the chamber such that the optical cavity 135 delimits a volume 112 in the chamber. The second parabolic mirror 130 further comprises an aperture 132 that preferably is centred around an optical axis 10 of the luminaire 100. The aperture 132 faces the volume 112.

The luminaire 100 further comprises a light source 140 that is mounted inside the optical cavity 135. Any suitable light source 140 may be used, such as an incandescent light source, e.g. an incandescent light bulb, a halogen light source or one or more solid state lighting elements such as light emitting diodes. The light source 140 may be mounted inside the optical cavity 135 in any suitable manner; for instance, a fitting may be attached to the first parabolic mirror 120 in any suitable manner, e.g. screwed or otherwise affixed thereto. As shown in FIG. 1, the light source 140 may be placed inside a holder 142, which may be a decorative holder, e.g. a holder having a particularly decorative shape. A non-limiting example of such a decorative shape is a flower-shape such as a rose although it should be immediately apparent that many more decorative shapes can be thought of. Such a holder may be manufactured in any suitable material. In an embodiment, the holder 142 is manufactured of a translucent material such as a translucent polymer, e.g. PC, PMMA, PET or another suitable polymer.

In FIG. 1 the light source 140 is placed on the optical axis than inside the optical cavity 135 by way of non-limiting example only; it should be understood that the light source 140 may also be placed inside the optical cavity 135 away from the optical axis 10.

In the embodiment of the luminaire 100 shown in FIG. 1, the optical cavity 135 is placed on top of the chamber defined by the body 110 and acts as a lid for this chamber. The optical cavity 135 may be kept in position in any suitable manner; in FIG. 1 the optical cavity 135 is kept in place by one or more brackets 114 that secure the optical cavity 135 to the body 110. It will however be immediately apparent to the skilled person that many other suitable securing methods may be considered. For instance, an upper portion of the body 110 may comprise threaded screw holes to receive screws that are threaded through holes in a rim around the optical cavity 135; an upper section of the body 110 may comprise hinged clips that are clipped onto receiving portions of the optical cavity 135 and so on. Many more examples will be apparent to the skilled person, such that it suffices to state that the optical cavity 135 may be secured to the body 110 in any suitable manner.

Figure 2:
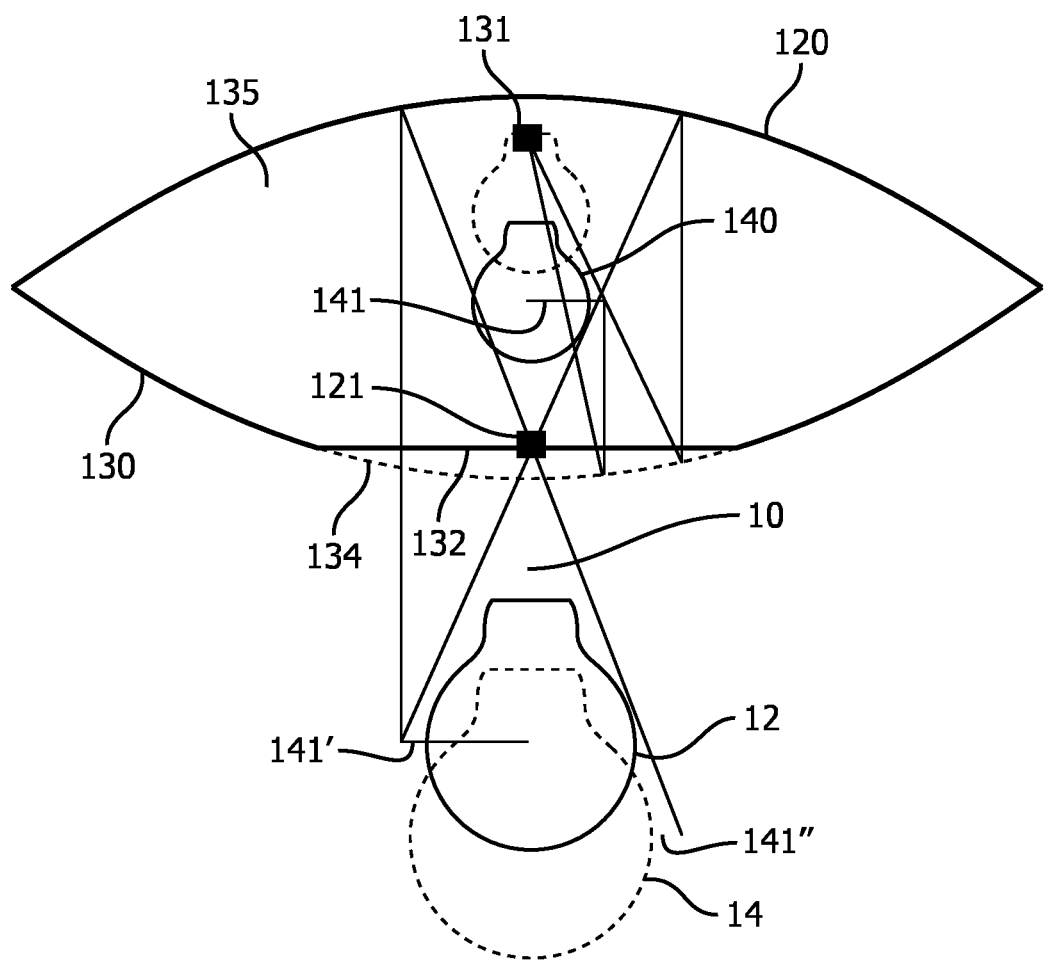
FIG. 2 schematically depicts the optical principle of the optical cavity in the luminaire of FIG. 1.

The operation of the luminaire 100 and in particular the optical cavity 135 will be explained in more detail with the aid of FIG. 2. As previously explained, the optical cavity 135 is formed by the cooperation of a first parabolic mirror 120 having a focal point 121 and a second parabolic mirror 130 having a focal point 131. In FIG. 2 the focal points 121 and 131 are spatially separated from each other by way of non-limiting example; it is equally feasible that these focal points 121 and 131 coincide with each other. A virtual arcuate section 134 is shown for the sake of clarity to demonstrate the overall shape of the second parabolic mirror 130. It will be understood that the virtual arcuate section 134 is not actually present; instead the second parabolic mirror 130 comprises an aperture 132 as previously explained.

The optical behaviour of parabolic mirrors is of course well-known per se and will therefore not be explained in further detail for the sake of brevity. The light source 140 is typically positioned relative to the focal point 121 and the focal point 131 such that the optical cavity 135 can produce an image 12 of the light source 140 (or of the holder surrounding the light source 140 as previously explained) in a desired position within the volume 112 of the luminaire 110. In FIG. 2, the light source 140 has a mark 141 for the purpose of aiding the explanation of the imaging operation of the optical cavity 135. Due to the fact that the focal point 121 and the focal point 131 are spatially separated, the optical cavity 135 generates a primary image 12 comprising the mark 141' and a secondary image 14 comprising the mark 141". As can be seen from the mark 141', the primary image 12 is a mirror image of the light source 140, whereas the secondary image can be considered the mirror image of the primary image 12.

The secondary image 14 typically is a virtual image that cannot be observed outside the luminaire 100, as it merely indicates the image reflected by the second parabolic mirror 130 towards the first parabolic mirror 120. The primary image 12, which is generated by the first parabolic mirror 120 by reflecting the secondary image 14 towards the aperture 132, can be observed outside the luminaire 100 as will be demonstrated later on. In case the focal points 121 and 131 do not coincide, the light source 140 may be placed in between the focal points 121 and 131 in order to achieve the creation of the primary image 12, with the location of the light source 140 in between these focal points governing the location at which the primary image 12 is generated within the volume 112.

The relatively high light intensity within the optical cavity 135 due to the presence of the light source 140 within the optical cavity 135 ensures that the primary image 12 can be observed under a wide range of viewing angles outside the luminaire 100. The light generated by the light source 140 and reflected within the optical cavity 135 to generate the primary image 12 is depicted by solid lines in FIG. 2, whereas the reflective light responsible for generating the secondary image 14 is shown by the dashed lines in FIG. 2. As will be readily understood by the skilled person, if the focal points 121 and 131 coincide, the secondary image 14 will coincide with the light source 140.

Figure 3:
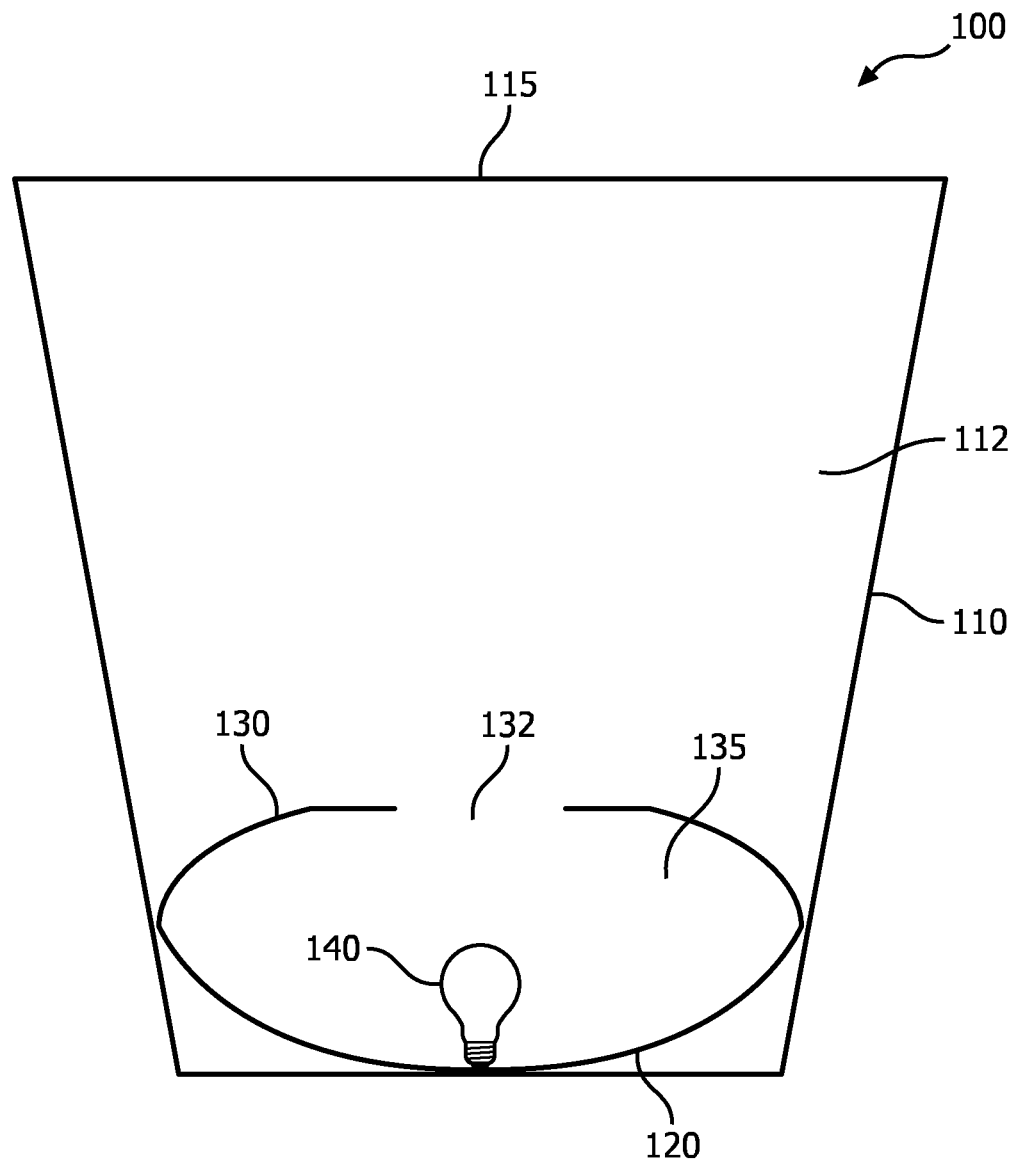
FIG. 3 schematically depicts a luminaire according to another embodiment of the present invention.

At this point, it is noted that the optical cavity 135 may be located in any suitable position within the chamber defined by the body 110. Whereas in FIG. 1 the optical cavity 135 is mounted in an upper region of this chamber, it is equally feasible that the optical cavity 135 is mounted in a lower region of this chamber, as is shown in FIG. 3. In this embodiment, the aperture 132 in the second parabolic mirror 130 is upward facing, i.e. faces the volume 112 delimited by the body 110 and the optical cavity 135. In this embodiment, the luminaire 100 may have a separate lid 115, which may be separate to the body 110 and fitted thereto in any suitable manner, or may be an integral part of the body 110.

Figure 4:
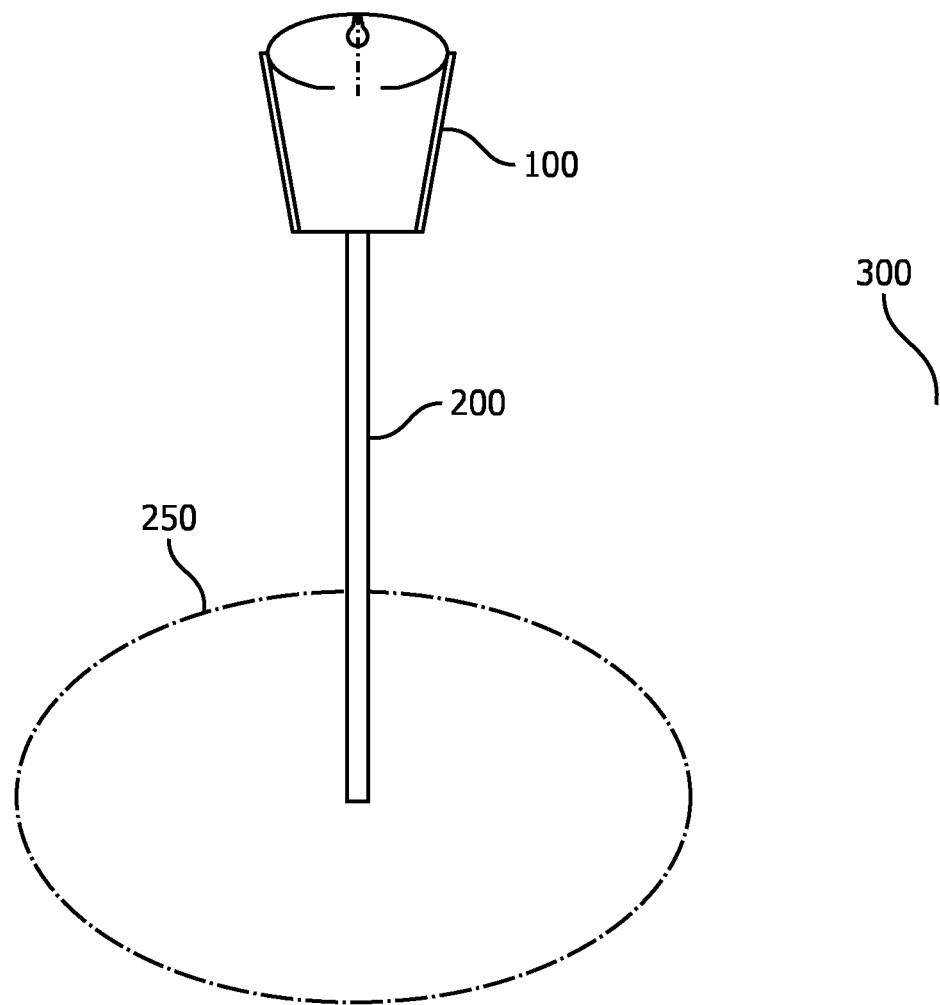
FIG. 4 schematically depicts a luminaire according to yet another embodiment of the present invention.

In an embodiment, the luminaire 100 may further comprise a mounting post 200, as is shown by way of non-limiting example in FIG. 4. Such a mounting post may be made of any suitable material, e.g. a metal or metal alloy such as steel, and may for instance house the electrical cabling for connecting the luminaire 100 to a power supply. As will be readily understood by the skilled person, the mounting post 200 may be dimensioned such that the luminaire 100 including a mounting post 200 complies with urban lighting requirements, e.g. that the luminaire 100 is positioned such that it generates a luminous distribution 250 of required dimensions alongside an area 300, e.g. a road, street, pavement, square, parking lot and so on. In FIG. 4, the mounting post 200 is connected to a bottom portion of the luminaire 100 by way of non-limiting example. It will be immediately understood by the skilled person that the mounting post 200 may have any suitable shape, e.g. an inverted L-shape, and may be connected to any suitable portion of the luminaire 100, e.g. a top portion of the luminaire 100 such that the luminaire is seen to dangle from the mounting post 200. Many variations to such arrangements are available such that it suffices to say that the luminaire 100 may be attached in any suitable manner to any suitably shaped mounting post 200.

Of course, if the luminaire 100 is to be used as a lighting source in an urban environment, it may be preferable that in addition to the image 12 generated by the optical cavity 135, the luminaire 100 further comprises functional lighting to generate a desired functional luminous distribution, such as the luminous distribution 250 shown in FIG. 4. In order to ensure that the image 12 can be observed separate from the functional luminous distribution, it may be desirable to generate the functional luminous distribution within a specific range of viewing angles, which ranges may be dictated by functional requirements, e.g. the size and location of the luminous distribution 250 as shown in FIG. 4, such that the image 12 can be observed by an observer observing the luminaire 100 under a viewing angle outside this specific range. This is for instance desirable if the image 12 is generated to provide an aesthetically pleasing appearance of the luminaire 100, and the intensity of the functional luminous distribution and/or the image 12 is such that the image 12 cannot be observed when the observer observed the luminaire 100 under a viewing angle lying inside this specific range. This for instance ensures that the luminaire 100 as a desirable a static appearance when being observed from a distance, whilst still providing the mandated functional performance in relative close vicinity to the luminaire 100.

Figure 5:
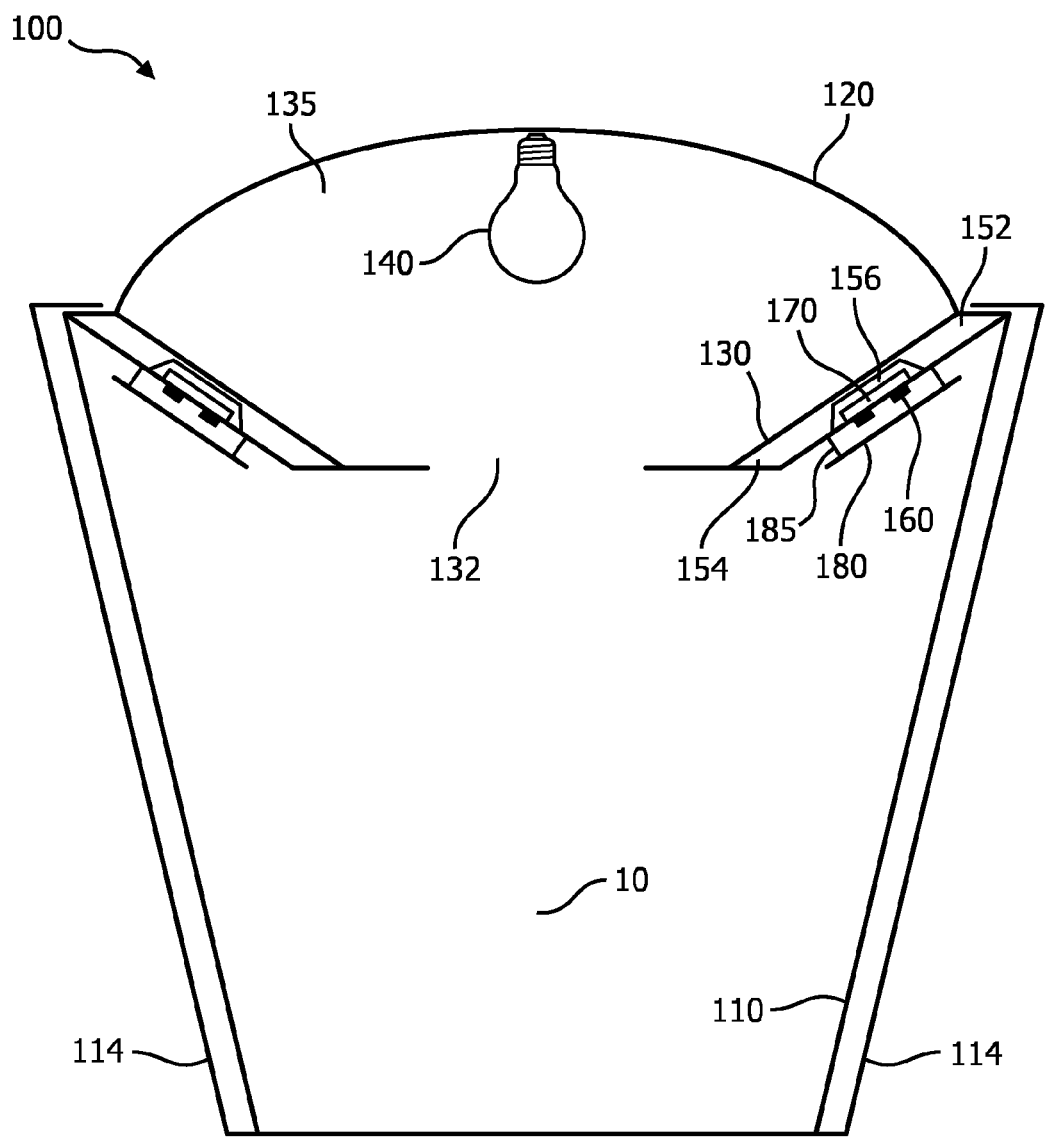
FIG. 5 schematically depicts a luminaire according to a further embodiment of the present invention.
Figure 6:
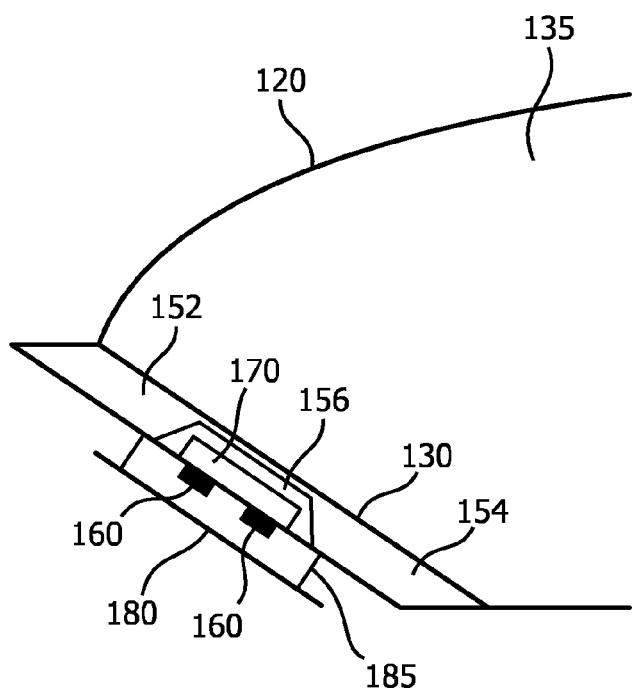
FIG. 6 schematically depicts a magnification of an aspect of the luminaire of FIG. 5.

An embodiment of a luminaire 100 combining the generation of the image 12 with functional lighting is shown in FIG. 5, whilst FIG. 6 shows the functional lighting part of the luminaire 100 in more detail. The luminaire 100 is essentially the same as the luminaire 100 shown in FIG. 5 apart from the addition of the functional lighting arrangement, such that the elements already described in the detailed description of FIG. 1 will not be described again for the sake of brevity only; instead, reference is made to the description of these elements in the detailed description of FIG. 1.

In FIG. 5, the luminaire 100 further comprises a plurality of solid state lighting elements 160 that are mounted inside the chamber of the luminaire 100. In a particularly advantageous embodiment, the solid state lighting elements 160 are mounted against the optical cavity 135, for instance mounted against the second parabolic mirror 130 as is shown in FIG. 5. This has the advantage that the luminous distribution produced by the solid state lighting elements 160 can be generated with minimal interference with the image 12 as will be explained in more detail later. The solid state lighting elements 160 may be light emitting diodes. Any suitable type of light emitting diode may be used for this purpose, e.g. a light emitting diode comprising an organic semiconductor material, an inorganic semiconductor material or combinations thereof, a light emitting diode generating white light, a light emitting diode generating coloured light or combinations thereof, and so on.

In an embodiment, the luminaire 100 comprises a holder for holding the solid state lighting elements 160, which holder for instance may comprise an upper portion 152 and a lower portion 154. The proportion 152 and the lower portion 154 may be discrete portions that combine to form the holder or maybe interconnected, e.g. separate portions of a single-piece holder. The holder may be affixed to the optical cavity 135 in any suitable manner, e.g. screwed, clipped, glued and so on.

The upper portion 152 and the lower portion 154 of the holder may combine to define a cavity 156 in which a heat sink 170 may be mounted to provide the appropriate heat dissipation for the solid state lighting elements 160 that are thermally coupled to the heat sink 170. In an embodiment, the solid state lighting elements 160 may be mounted on a first surface of a carrier such as a printed circuit board, with the heat sink 170 being mounted on the opposite surface of the carrier. This simply is an example arrangement and many alternative heat sink arrangements that are commonly applied in the field of solid state lighting are equally feasible, and the skilled person will immediately realise that these alternative arrangements may also be applied without departing from the teachings of the present invention. It will furthermore be understood that the luminaire 100 may comprise a plurality of solid state lighting elements 160 grouped in several groups, with each group in a different physical location. For instance, the luminaire 100 may comprise several printed circuit boards each carrying a number of solid state lighting elements 160, with each printed circuit board located between different locations on upper portion 152 and the lower portion 154 of the solid-state lighting elements holder.

In order to shape the luminous distribution produced by the solid state lighting elements 160, the luminaire 100 may further comprise one or more lens arrays 180 that are arranged such that the (majority of the) luminous output of the solid state lighting elements 160 passes the one or more lens arrays 180 before exiting the luminaire 100 through the light exit surface defined by the body 110. In an embodiment, each group of solid state lighting elements 160 is associated with a separate lens array 180.

The one or more lens arrays 180 may be fitted directly over the solid state lighting elements 160 may be spatially separated therefrom as shown in FIGS. 5 and 6. For instance, the one or more lens arrays 180 may be mounted on mounting elements 185, e.g. screws, which extend from the holder of the solid state lighting elements 160. For instance, a first screw may extend from the upper portion 152 and a second screw may extend from the lower portion 154, with a lens array fitted at respective and portions of the first and second screws as shown in detail in FIG. 6.

Figure 7:
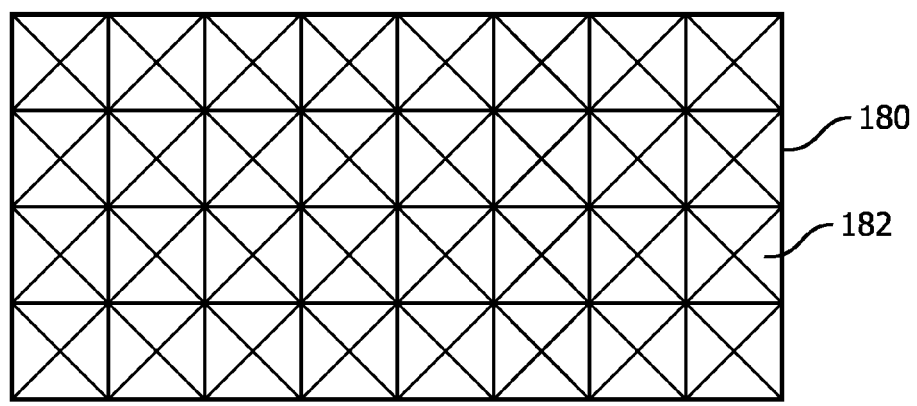
FIG. 7 schematically depicts a lens array for use with the luminaire of FIG. 5.

Each lens array 180 typically comprises a plurality of micro lenses, which micro lenses may comprise a faceted light entry surface (i.e. the surface facing the solid state lighting elements 160) and/or a faceted light exit surface (i.e. the surface facing the volume 112) in order to redirect the luminous output of the solid state lighting elements 160 in the desired direction. FIG. 7 schematically depicts an example embodiment of a lens array 180 comprising a plurality of micro lenses 182, wherein each micro lens 182 has a faceted light exit surface shaped as a pyramidal prism. It will be understood that the light entry surface and a light exit surface of such micro lenses may have any suitable shape. The operation of such lens arrays is well-known per se and will therefore not be explained in further detail for the sake of brevity only. The one or more lens arrays 180 may be manufactured from any suitable material, e.g. glass or an optical grade polymer such as PC, PMMA, PET or the like.

The one or more lens arrays 180 are typically configured to ensure that the angular distribution of the (majority of the) luminous distribution produced by the solid state lighting elements 160 is reduced to the aforementioned range of viewing angles to ensure that the image 12 can be observed by an external observer when observing the luminaire 100 underage viewing angle lying outside this range of viewing angles as previously explained. By fitting the solid state lighting elements 160 and the corresponding lens arrays 180 against the optical cavity 135, the range of viewing angles under which the image 12 can be observed is optimized, because interference between the light generated by the solid state lighting elements 160 and the image 12 is minimized. In other words, a large portion of the volume 112 is not contaminated by the light generated by the solid state lighting elements 160, such that an image 12 formed in this portion of the volume 112 can be observed by an external observer when looking at the luminaire 100 under an appropriate viewing angle.

Figure 8:
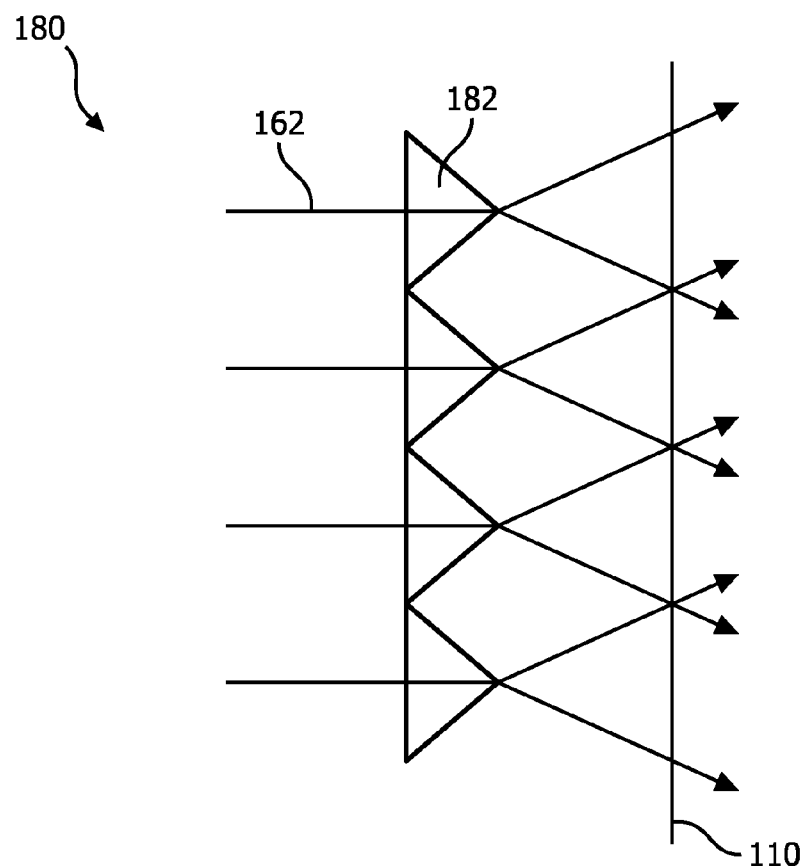
FIG. 8 schematically depicts an optical principle of the lens array of FIG. 7.

Optionally, the one or more lens arrays 180 may be further configured to generate a pattern in the luminous output produced by the lens arrays 180, which pattern for instance may be shaped to complement the image 12 generated by the optical cavity 135 to further enhance the aesthetic appearance of the luminaire 100. Such a pattern for instance may be visible on the lens arrays 180 and/or on the light exit surface of the body 110. To this end, at least a subset of the micro lenses 182 of each lens array 180 may be shaped to generate such a pattern. This is schematically depicted in FIG. 8, in which incident light 162 originating from one or more solid state lighting elements 160 is redirected by prism-shaped micro lenses 182 of a lens array 180, i.e. split (dispersed) into two beams of opposite angles such that regions of high light intensity contrasted by regions of low light intensity are generated on the surface of the body 110.

Alternatively, at least some of the micro lenses 182 may be shaped such that the pattern to be generated appears on the surface of the lens array 180 to an observer looking at the lens array 180 from a specific viewing angle. As will be apparent to the skilled person, different micro lenses 182 of the lens array 180 may have different shapes, e.g. surface facets under different angles, in order to generate the desired pattern. The pattern may be generated by the luminance distribution among the micro lenses 182 of the micro lens array 180, which distribution is correlated to the curvature or slope of the respective surfaces of the micro lenses 182. In a preferred embodiment, the patterns thus generated by the one or more lens arrays 180 are only visible under specific viewing angles such that outside such viewing angles the luminous distribution produced by the lens arrays 180 will appear to be uniform. This ensures that the functional luminous distribution is not compromised by the generation of the patterns in this luminous distribution.

Figure 9:
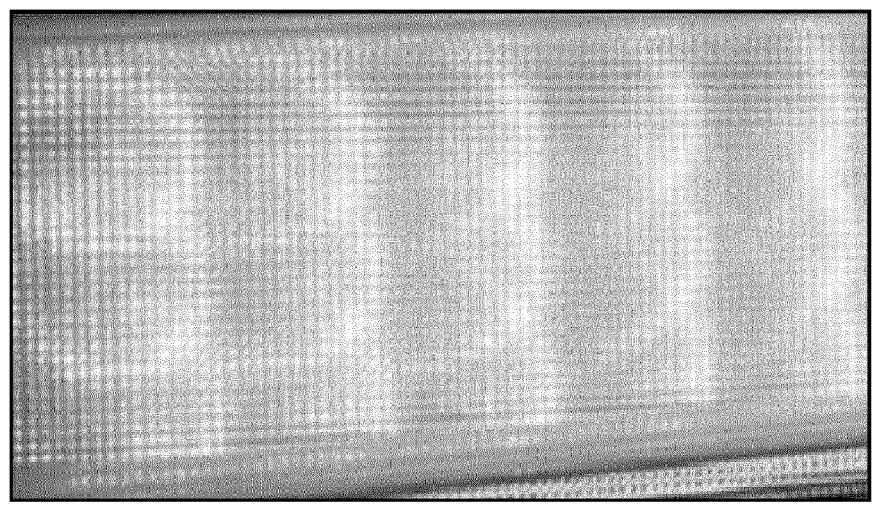
FIG. 9-11 are images of example patterns generated with a lens array of a luminaire according to an embodiment of the present invention.
Figure 10:
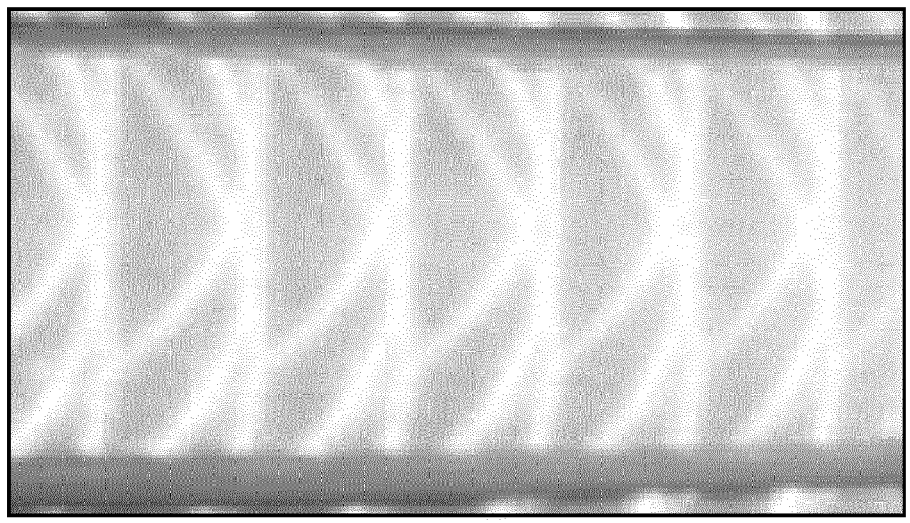
Figure 11:
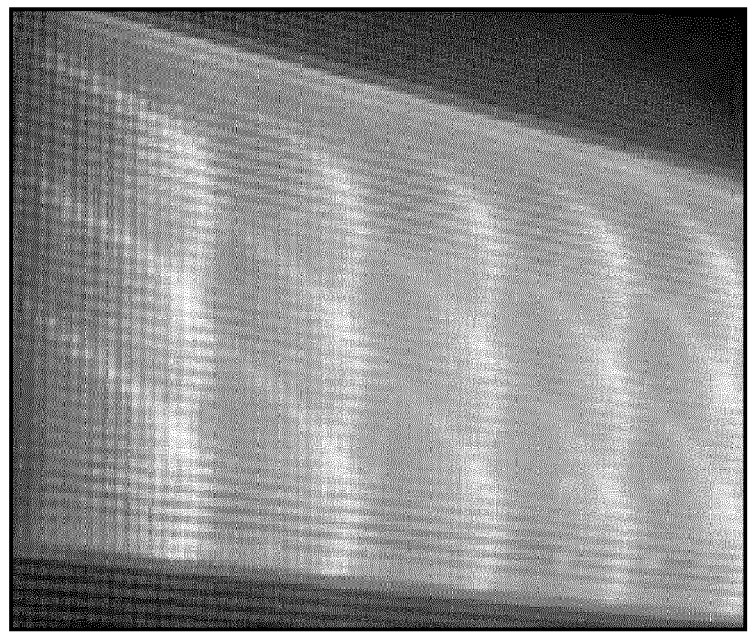

The images shown in FIG. 9-11 provide some non-limiting examples of patterns generated on the surface of a lens array 180 to demonstrate the proof of concept of the pattern generation by such lens arrays.

Figure 12:
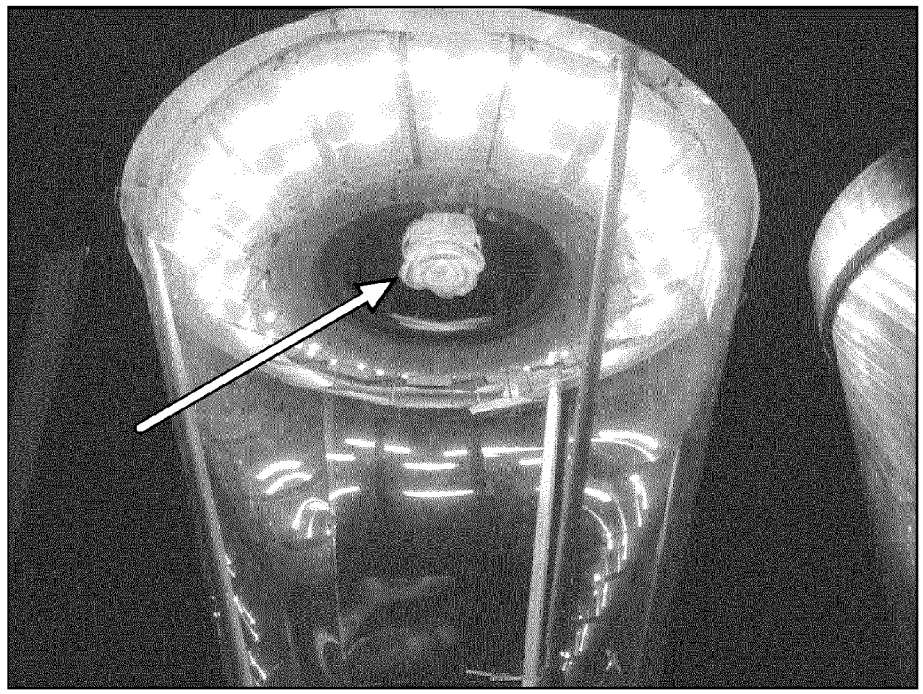
FIGS. 12 and 13 are images of a luminaire according to an embodiment of the present invention providing proof of concept of the 3-D image generation inside the luminaire.
Figure 13:
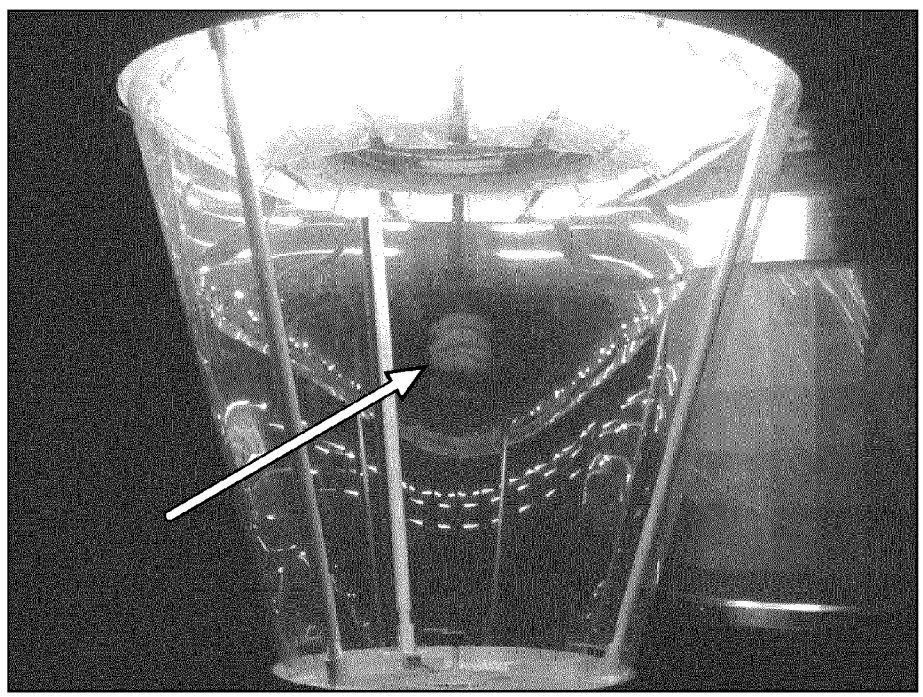

FIG. 12 and FIG. 13 show images of a luminaire 100 in which an image 12 (indicated by the white arrows) is generated (here a decorative image of a rose- shaped translucent holder in which the light source 140 is placed within the optical cavity 135) in the presence of functional lighting (solid state lighting elements 160) fitted to the optical cavity 135. The difference between FIG. 12 and FIG. 13 is the positioning of the light source 140 relative to the first focal point 121 in order to adjust the location within a volume 112 at which the image 12 is generated as previously explained. It is clear from FIG. 12 and FIG. 13 that a clearly observable image 12 can be generated within the luminaire 100 in the presence of functional lighting, thereby providing a luminaire 100 that provides the necessary functional performance and combines this performance with an enhanced aesthetic appearance.

Figure 14:
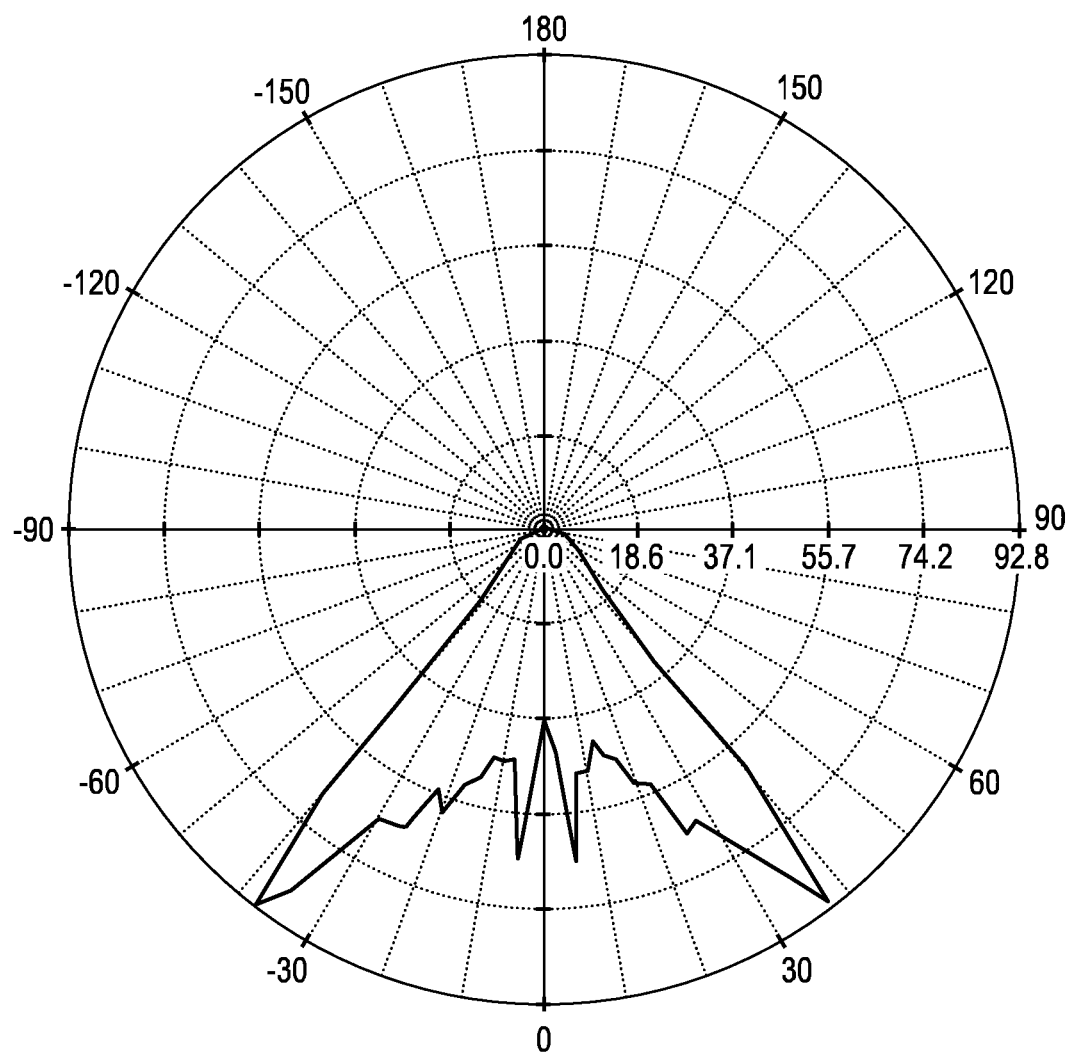
FIG. 14 is a light distribution plot of a luminaire according to an embodiment of the present invention.

FIG. 14 is a light distribution plot of a luminaire 100 according to an embodiment of the present invention in which an image 12 is generated in combination with functional lighting as previously explained. As can be seen from this light distribution plot, the functional lighting is generated predominantly in a range of viewing angles from 0° to 40° relative to the optical axis 10 of the luminaire 100, such that an external observer can observe the image 12 outside these viewing angles, i.e. at viewing angles larger than 40°. It is noted for the avoidance of doubt that the range of viewing angles under which the functional lighting is generated (here 0° to 40° relative to the optical axis 10) is chosen by way of non-limiting example only; this range may be adjusted depending on the functional requirements that the luminaire 100 has to meet, e.g. the size and position of a luminous distribution 250 to be generated by the luminaire 100. As previously explained, the range of viewing angles may be tailored by the appropriate design of the one or more lens arrays 180.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:
1. A luminaire comprising:
a chamber delimited by a body defining a light exit surface of the luminaire; and
an optical cavity inside the chamber such that the chamber comprises a volume delimited by the body and the optical cavity,
wherein the optical cavity is delimited by a first parabolic mirror and a second parabolic mirror facing the first parabolic mirror, the second parabolic mirror comprising an aperture facing the volume, the optical cavity comprising a light source mounted inside said optical cavity;
wherein the first parabolic mirror and the second parabolic mirror are shaped to create an image of the light source in the volume;
wherein the luminaire further comprising a plurality of solid state lighting elements in said chamber, wherein the solid state lighting elements are arranged to create a luminous distribution under a first range of viewing angles outside said luminaire such that the image can be observed outside said first range.

2. The luminaire of claim 1, wherein the optical cavity is mounted in an upper or lower region of the chamber with the aperture facing said volume.

3. The luminaire of claim 2, wherein the optical cavity is mounted in said upper region and the first and second parabolic mirrors define a lid of said chamber, the luminaire further comprising at least one fixing member for securing the lid to the chamber.

4. The luminaire of claim 1, wherein the light source is placed in a decorative holder.

5. The luminaire of claim 1, wherein the first parabolic mirror creates a first focal point and the second parabolic mirror creates a second focal point, wherein the first focal point is spatially separated from the second focal point.

6. The luminaire of claim 1, further comprising a lens array over each of the solid state lighting elements for shaping the luminous distribution of said solid state lighting elements.

7. The luminaire of claim 6, wherein the lens array comprises a plurality of micro lenses each having a light exit surface angled relative to the normal of the main surface of the lens array for redirecting light from the solid state lighting element in a direction determined by said angle, wherein said plurality of micro lenses comprises a subset of micro lenses cooperating to create a pattern in said luminous distribution.

8. The luminaire of claim 7, wherein the pattern is projected onto said body.

9. The luminaire of claim 6, wherein the solid state elements are mounted on a holder.

10. The luminaire of claim 9, wherein the holder comprises a cavity housing a heat sink thermally coupled to at least some of the solid state lighting elements.

11. The luminaire of claim 9, wherein the lens array each solid state lighting element is mounted on said holder such that the lens array is spatially separated from said solid state lighting element.

12. The luminaire of claim 10, wherein the holder is mounted against the second parabolic mirror.

13. The luminaire of claim 1, further comprising a mounting post, wherein the luminaire is mounted at one end of the mounting post.

14. The luminaire of claim 1, wherein the light exit surface is at least partially translucent or transparent.

* * * * *